United States Statutory Invention Registration [19]

[11] Reg. Number: H561

Brown et al. [43] Published: Dec. 6, 1988

[54] COLD PROCESS FRUIT FILLING

[75] Inventors: Cheryl C. Brown; John H. Woerman, both of Decatur, Ill.

[73] Assignee: A. E. Staley Manufacturing Division of Staley Continental, Inc., Decatur, Ill.

[21] Appl. No.: 212,543

[22] Filed: Jun. 28, 1988

[51] Int. Cl.[4] ..... A23L 1/195

[52] U.S. Cl. ..... 426/661; 426/658

U.S. PATENT DOCUMENTS

| | | | |
|---|---|---|---|
| 3,677,151 | 7/1972 | Scharschmidt | 99/86 |
| 3,833,741 | 9/1974 | Katz | 426/94 |
| 3,892,871 | 7/1975 | Cooper | 426/573 |
| 3,867,560 | 2/1975 | Menzi et al. | 426/350 |
| 4,219,646 | 8/1980 | Rubens | 536/109 |
| 4,567,055 | 1/1986 | Moore | 426/578 |
| 4,704,293 | 11/1987 | Moore et al. | 426/573 |
| 4,562,080 | 12/1985 | Tenn | 426/94 |

*Primary Examiner*—Deborah L. Kyle
*Assistant Examiner*—Michael J. Carone
*Attorney, Agent, or Firm*—Michael F. Campbell; J. Daniel Wood; James B. Guffey

[57] ABSTRACT

A cold process fruit filling for pastry and bakery products is prepared using two different starch components. The first starch component is a cold water swelling granular starch, while the second starch component is a pregelatinized starch. Such a combination of starches provided a means to produce a fruit filling without heating. The filling possesses heat stability to maintain the desired properties when the bakery product containing the filling is cooked.

2 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COLD PROCESS FRUIT FILLING

FIELD OF INVENTION

This invention relates to cold process fruit fillings for pastry and bakery products and to processes for preparing such fruit fillings.

BACKGROUND OF THE INVENTION

Fruit fillings have traditionally been used as a component for bakery and pastry products. U.S. Pat. No. 3,676,151 issued July 11, 1972 (Scharschmidt) is an example of a disclosure of a fruit filling designed to be incorporated into a dough. The dough is then oven baked. The finished product is stored until ready for use, at which time it is placed in a toaster. A difficulty with such product is that its filler is not heat stable. If the pastry dough is not adequately sealed, the filler has a tendency to run out when heated thus playing havoc with the toaster, to say nothing of the loss of the filler. Such patent teaches the use of a combination of apple powder and invert syrup, which is a mixture of dextrose and fructose, but the proportions are low. Such patent also teaches the use of a high percentage of granular sugar.

U.S. Pat. No. 3,833,741 (Katz, et al.) teaches the production of a heat stable filling by production of a two-phase filling, that is, a disperse phase of relatively small fat globules suspended in a polar matrix composed of protein, water and a mono or disaccharide. Heat coagulable proteins, such as soy, and even gelatin are used as a heat stabilizing ingredient--such patent asserts having produced a filler that resists flow upon being heated. The process of preparation for such a filling requires the application of considerable external heat. For example, in a typical preparation, the mixture is heated to 110° to 120° F. The heat is probably necessary because such filling uses a considerable portion of fat in its preparation.

U.S. Pat. No. 3,892,871 issued July 1, 1975 (Cooper) discloses that jelly can be produced by the use of a corn syrup having a high fructose content with substantially no other sugar present except that derived from corn syrup. The jellies are made from corn syrup containing at least 15 percent of high fructose corn syrup, a natural fruit flavor, pectin (or modified pectin) and an acidifying agent. Pectin is a gelling agent. In the examples, the ratio of high fructose corn syrup (71 percent solids) to pectin is as high as 59.2 (or more) to one.

U.S. Pat. No. 3,867,560 issued Feb. 18, 1975 (Menzi, et al.) teaches dietetic confectioneries that are prepared from an aqueous homogeneous paste prepared from a mixture containing at least one assimilable carbohydrate selected from the group consisting of monosaccharides and oligosaccharides (in a proportion of from 35 to 60 percent by weight), at least one assimilable protein material soluble or dispersible in an aqueous medium of a pH between 6.2 and 7.2 (in a proportion of between 1 to 45 percent by weight), at least one gelling agent which is a gelling protein and a gelling carbohydrate, and between 4 and 24 percent by weight of water. The gelling agent contains at least 70 percent by weight of non-assimilable material. The entire amount of the gelling agent in the entire quantity of the mixture is between 12 and 20 percent by weight. Menzi, et al., teaches the use of a high fructose corn syrup as the assimilable carbohydrate. In one embodiment, the mixture can contain 12 to 40 weight percent of the gelling agent and a powdery vegetable cellulose material, such as apple marc. In the examples, the paste (used for the dietetic confectioneries) has a maximum ratio of fructose (as a syrup containing 70 percent by weight of dry materials) to apple marc powder of 1.89 to 1. An important ingredient of the patent produce is a foamable protein, or else the mixture is preferably heated to 85° to 100° C.

U.S. Pat. No. 4,234,611 issued Nov. 18, 1980 (Kahn, et al.) discloses one of the more recent products adapted for a wide variety of uses, including pastry filling. While such patent teaches a high fructose syrup and apples, it does not preclude the use of granular sugars or fat. The apples appear to be used solely as a fruit source. Starch is also an ingredient and the essence of the invention of such patent appears to be the production of a microbiologically stable food which can be kept at freezer or room temperature for extended periods. The application of heat is necessary in the preparation of such fillers.

The use of starch in fruit-containing products such as fillings and confections is well known in the art. U.S. Pat. No. 4,567,055, issued Jan. 28, 1986 to Moore, describes a process which comprises heating and extruding a mixture of sugar, water, and about 12 to 20 weight percent of a cold water swelling starch having an especially high gel strength. The starch is gelatinized as the mixture passes through the extruder, which subjects the mixture to heat and shear under high pressure. Optional ingredients include colors, flavors, fruit purees, juice concentrates, and acidulants. The relatively high level of the cold water swelling, high gel strength starch is employed to give the mixture a sufficiently-high viscosity for forming at the moisture level of the confection. This high level of starch also contributes to a final product texture which is firm, but more resilient than the traditional Mogul system gel confection.

Another Moore patent, U.S. Pat. No. 4,704,293, issued Nov. 3, 1987, which is incorporated by reference, discloses a process for preparing a gel confection comprising: (a) heating a first component comprising sugar, water, and a first gelling agent under conditions which activate the first gelling agent; (b) preparing a second component comprising a second gelling agent, characterized in that it is an instant starch capable of hydrating in room temperature water, under conditions which prevent activation of the second gelling agent; (c) mixing the first component and the second component under conditions which activate the second gelling agent and to produce a mixture comprising about 40 to 80 weight percent sugar, about 10 to 50 weight percent water, about 1 to 20 weight percent of the first gelling agent, and about 1 to 10 weight percent of the second gelling agent; (d) obtaining the desired mixture viscosity for forming; and (e) forming the mixture into the desired shape. Each of the gelling agents may be starches. The first gelling agent may be any type of starch capable of thickening or gelling. The second gelling agent is an "instant" starch, either a pregelatinized starch or a cold water swelling granular starch. Various fruit components were described as optional ingredients.

SUMMARY OF THE INVENTION

The object of this invention is to provide an improved fruit filling for pastry and baked foods. Another object is a cold process for production of the fruit filling.

This invention relates to an edible fruit filling composition for incorporation within a pastry dough sheath comprising:

(a) a minor amount (e.g., about 1 to about 7 percent) of a cold water swelling granular starch;

(b) a minor amount (e.g., about 3 to about 8 percent) of a pregelatinized starch; and (c) a major amount (e.g., about 40 to about 70 percent) of a sweetener component selected from the group comprising sucrose, dextrose, corn syrup, fructose and high fructose corn syrup.

The use of the terms "major" and "minor", above, are intended, in this context, to denote the relative amounts of starch (i.e., minor) in relation to the relative amount of sweetener (i.e., major). In other words, the terms denote that the amount of the sweetener is greater than the amount of either starch (and preferably both taken cumulatively).

DETAILED DESCRIPTION

The cold process fruit filling of this invention comprises two distinct starch components in order to provide the desired textural properties and processing conditions.

A. The First Starch Component

The first starch component comprises a cold water swelling, granular nonbirefringent starch having a fat content of less than 0.25 weight percent, a cold water solubility of greater than 50 weight percent and gel strength of greater than 90 grams. The cold water solubility is measured by the test described in Example 1 and the gel strength is measured by the test described in Example 2. Eastman, U.S. Pat. No. 4,465,702, issued Aug. 14, 1984, which is incorporated by reference, describes a process for preparing such a starch. Suitable starches include unmodified (i.e., no chemical modification other than the alcohol processing described in Eastman) and modified (e.g., substituted, crosslinked, thinboiling, and oxidized) corn, tapioca and potato starches.

It is preferred that this starch comprise an unmodified or lightly modified corn starch. Unmodified and lightly-modified corn starches which have been alcohol processed as described in Eastman exhibit gel strengths greater than 90 grams. Unmodified corn starch has the greatest gel strength, making it most preferred. Such a starch is MIRA-GEL ® 463 corn starch, a commercial product of the A. E. Staley Manufacturing Division of Staley Continental, Inc.

The first starch component comprises from about 1 to about 7 percent, preferably from about 3 to about 6, most preferably 3 to about 5 percent of the fruit filling. The first starch component provides consistency and viscosity to the fruit filling so that it can be handled in bakery operations where it is put into pastry or baked food products.

B. The Second Starch Component

The second starch component comprises a starch characterized in that it is a starch capable of hydrating in room temperature water, known in the trade as an instant starch. There are two basic types of instant starch: (1) precooked (pregelatinized) starch and (2) cold water swelling granular starch.

Cold water swelling granular starches suitable as the second component starch include SOFT-SET TM starch sold by the A. E. Staley Manufacturing Division of Staley Continental, Inc. This starch has also been marketed as F4-482 or TENDERSET TM starch. SOFT-SET TM starch is a crosslinked, acid thinned cold water swelling granular starch.

A desired second starch component is one which comprises a pregelatinized starch having a larger particle size that mimics fruit pulp. Suitable pregelatinized starches include corn (including waxy or dent), tapioca and potato starches. The second starch component may be either unmodified or chemically modified. A preferred starch is both chemically substituted and crosslinked. Pregelatinized tapioca starch is a preferred starch for the second component.

The second component starch may be prepared by various means to cook out or gelatinize the starch and dry the starch to yield a granular appearing starch particle. Processes include jet cooking, spray drying and agglomerating the starch or cooking and drying the starch in a drum dryer. The drum drying process is the preferred means to process the second component starch.

The particle size of the second component starch should generally be between 70 and 350 microns. A preferred particle size for the second component starch is at least 30 percent of the starch with a particle size greater than 300 microns with no more than 30 percent of the starch having a particle size less than 70 microns.

Preferred second component starches are exemplified by BINASOL TM 15 or BINASOL TM 81 starches which are commercial products of the A. E. Staley Manufacturing Division of Staley Continental, Inc. The BINASOL TM starches are substituted, crosslinked starches that have a particle size in the desired range.

The second component starch will provide a fruit-like pulpy texture to the fruit filling, but do not develop their optimum viscosity characteristics or hydrate completely until the first fruit filled bakery product is baked or heated.

C. The Sweetener Component

The sweetener component for the fruit filling can be any of the traditional mono and disaccharide sweeteners used in fruit products. Suitable sweeteners include sucrose, dextrose, corn syrup, high fructose corn syrup and fructose. Artificial or non-nutritive sweeteners such as saccharin, chlorosucrose, aspartame, and acesulfame K, among others, may be used to replace some of the nutritive sweeteners. Polydextrose (available from Pfizer Chemical Co.) is a low calorie bulking agent that is suitable as a sweetener component. The type and amount of sweetener used depends upon sweetness level desired, type and amounts of fruit-containing material used, and viscosity and water activity desired in final product.

D. The Fruit Component

The fruit component of this invention may be fresh fruit, frozen fruit, dried fruit, fruit puree, fruit pieces, fruit juice, fruit pulp or any other source of fruit solids and flavor.

The fruits that can be used as a fruit component in this invention include apples, pears, cherries, grapes, strawberries, peaches, dates, figs, pineapples, lemons, oranges, papaya, bananas, nectarines, blueberries, raspberries, blackberries, mangos, elderberries, loganberries, currants, raisins, melons, kiwi (sapota), plums, and others.

The amount of the fruit component in the fruit filling formulation may vary from about 5 percent to about 30 percent of the solids of the formulation. Economic considerations may affect the level of fruit used in the formulation. Preferred compositions contain from about 5 to about 25 percent fruit solids, most preferably from about 10 to about 25 percent fruit solids.

E. Other Components

Other components of the fruit filling include food acids, such as citric acid, malic acid, ascorbic acid, adipic acid, fumaric acid, succinic acid, tartaric acid, phosphoric acid, and hydrochloric acid, and mixtures and sources thereof. The acid level in the food is adjusted to provide the desired flavor and preservative effects by pH control.

Other gelling agents may be added to the fruit filling composition depending upon the characteristics desired in the final product. Suitable gelling agents include pectins, agar, alginate, cellulose gums, locust bean gum, guar gum, gelatin, and similar agents, either alone or in combination.

Vegetable oils or other edible fats or oils may be used to provide textured properties and to act as an ingredient carrier.

Flavors and colors may be added to enhance the eating properties of the fruit filling mix.

F. Processing Conditions

The fruit filling of this invention is prepared without cooking. The combination of the two different starch components provides a formulation than can be cold processed, yet have the desired textural and viscosity properties in the final baked products. The high solids fruit filling does not require heat processing to evaporate out excess water, but does have the required viscosity or flow property for extrusion or depositing into the pastry or bakery product dough. The second starch component provides resistance to boil out during final baking of the product containing the fruit filling.

The following general steps can be used to prepare the fruit filling:

1. mix starch component one with liquid sweetener and other liquid ingredients to form a smooth slurry;
2. prepare a dry blend of starch component two with dry ingredients;
3. mix liquid slurry of step 1 with dry blended materials of step 2;
4. add fruit component and mix well to form fruit filling;
5. add fruit filling to pastry or dough shell or sheath; and
6. bake fruit filled pastry or dough shell or sheath.

The fruit filling should have a water activity ($A_w$) prior to cooking of less than 0.70 to 0.75 to provide a shelf stable product. Preservatives such as sodium benzoate, sorbic acids, etc., may be used to improve the microbial stability of the fruit fillings.

The fruit filling of this invention can be used in cookies, breakfast rolls, toaster pastries, and various other pastry and baked foods.

The present invention is further illustrated, without limiting the invention, by the following examples thereof. In this specification, all ratios, parts and percentages, unless otherwise specified, are on a weight basis and all temperatures are stated in °C.

EXAMPLE 1

This example describes the test used to measure the cold water solubility of a starch.

The following equipment is used in the test:

1. Waring Model PB5 Blender equipped with a semi-micro monel metal clip;
2. International Model K Centrifuge or similar centrifuge;
3. 100 ml centrifuge tubes;
4. evaporating dish; and
5. balance.

The test procedure is as follows:

1. pour 100 ml of distilled water at room temperature into the Waring Blender cup;
2. turn the blender on slow speed (about 6,100 rpm) and add 1.00 g dry substance basis of starch over less than a 15 second period;
3. stir on high speed (about 13,500 rpm) for 2 minutes;
4. pour the starch solution/suspension into a 100 ml centrifuge tube and centrifuge at maximum speed (3,100 rpm is satisfactory) for 15 minutes;
5. transfer a 25 ml aliquot of the supernatant to a tared evaporating dish and evaporate on a steam bath to apparent dryness; and
6. dry in an oven at 110° C. for at least 1 hour and weigh.

The cold water solubility of the starch, expressed as weight percent water solubles on a dry substance basis, is then calculated according to the following fourmula:

$$\text{Cold Water Solubility (\% dsb)} = \text{Wt. of solids in 25 ml} \times 4 \times 100$$

EXAMPLE 2

This Example describes the test used to measure the gel strength of a starch.

The following equipment is used in the test:

1. Voland Stevens LFRA Texture Analyzer with Integrated Recorder and one-half inch AOAC spindle;
2. Sunbeam Mixmaster Mixer with 6 inch mixing bowl; and
3. balance.

The test procedure is as follows:

1. mix 47.5 g dry substance starch and 150 g ISOSWEET ® 5500 syrup (a high fructose corn syrup manufactured and sold by the A. E. Staley Manufacturing Division of Staley Continental, Inc. containing about 77 percent saccharide and having a ratio of fructose to glucose of 55 to 45) for 2 minutes in the mixer at speed #1;
2. add 450 ml of distilled water at room temperature and continue mixing at speed #1 for 45 to 50 seconds;
3. mix at speed #6 for 2 minutes;
4. let the mixture stand at room temperature for 15 minutes; and
5. place the mixing bowl on the texture analyzer and measure the gel strength at the following settings: penetration speed, 1.0 mm per second and penetration distance, 20 mm.

EXAMPLE 3

An apple fruit filling for cookies was prepared from the following formulation:

| Ingredients | % | % Solids | % Water |
|---|---|---|---|
| Sucrose - Bakers Special | 34.6 | 34.6 | — |
| SWEETOSE ® 4300 Corn Syrup* | 24.6 | 20.0 | 4.6 |
| Water | 12.8 | — | 12.8 |
| Apples (cut into eighths) | 9.1 | 7.0 | 2.1 |
| Apple Powder | 4.6 | 4.4 | .2 |
| Starch Component No. 1 - | | | |
| MIRA-GEL ® 463 Starch* | 2.7 | 2.43 | .27 |
| Flavor | 3.6 | — | 3.6 |
| Starch Component No. 2 - | | | |
| BINASOL TM 81 Starch* | 4.6 | 4.1 | .5 |
| Apple Juice | 1.8 | 1.26 | .54 |
| Malic Acid | .27 | .27 | — |
| Citric Acid | .27 | .27 | — |
| Liquid Vegetable Oil | .90 | .90 | — |
| Cinnamon | .10 | .10 | — |
| Nutmeg | .06 | .06 | — |
| | 100.00 | 75.39 | 24.61 |

*A. E. Staley Manufacturing Division, Staley Continental, Inc.

Procedure

1. The malic acid and citric acid were added to 50° C. water and mixed until dissolved.

2. Then the apple powder and apple flavor were mixed into the acid solution to form mixture no. 1.

3. In a separate container, the MIRA-GEL ® 463 starch was blended into corn syrup that had been warmed to 45° C. to form mixture no. 2.

4. Mixtures No. 1 and 2 were blended together and the vegetable oil was added to the combined mixture. The combined mixture was allowed to set for 5 to 10 minutes to allow the starch to hydrate to form a starch slurry.

5. The $\frac{1}{8}$ cut apples were then mixed into the starch slurry.

6. The sucrose, cinnamon and nutmeg were preblended and added to the apple containing starch slurry and then the BINASOL TM 81 starch was added to yield the fruit filling.

The apple fruit filling had an $A_w$ of 0.74.

EXAMPLE 4

A high solids strawberry filling for baking products, including toaster pastries, was prepared from the following formulation:

High Solids Strawberry Filling for Bakery Products

| Ingredients | g/Batch | % dsb |
|---|---|---|
| Part I | | |
| Strawberries | 2200.0 | 5.3 |
| SWEETOSE ® 4300 Corn Syrup* | 2097.0 | 41.2 |
| Sugar | 1840.0 | 44.1 |
| SOFT-SET TM Starch* | 232.0 | 5.3 |
| Red #40 | .4 | — |
| Ottens #3090 Art. Strawberry Flavor | 3.2 | — |
| Part II | | |
| MIRA-GEL ® 463 Starch* | 36.2 | .8 |
| Paramount B Shortening | 139.8 | 3.3 |
| | 6548.6 | 100.0 |

*A. E. Staley Manufacturing Division, Staley Continental, Inc.

Procedure

1. All Part I ingredients except SOFT-SET TM starch were placed into a steam jacketed kettle and agitated with no heat.

2. After the above mixture was uniformly dispersed, the SOFT-SET TM starch was added and allowed to blend uniformly. The mixture was heated and cooked to 80% solids (about 228° C.)

3. A smooth blend of MIRA-GEL ® 463 starch and melted Paramount B was prepared and blended into Part I.

4. The filling was cooled to 120° F. or less.

The strawberry filling was deposited into a thin rectangular sheet of dough and the dough folded over and crimped to make a toaster pastry. The filled pastry was baked at 425° F. for 16 minutes.

EXAMPLE 5

A cold process high solids blueberry filling for baked foods was prepared from the following formulation:

Cold Process High Solids Blueberry Filling for Baked Products

| Ingredients | % of Total | g/Batch |
|---|---|---|
| SWEETOSE ® 4300 Corn Syrup* | 21.2 | 848.0 |
| MIRA-GEL ® 463 Starch* | 2.5 | 100.0 |
| SOFT-SET TM Starch* | 3.0 | 120.0 |
| Cherry Juice Concentrate (60° Brix) | 16.8 | 672.0 |
| Water | 4.8 | 192.0 |
| STALEYDEX ® 111 Dextrin* | 37.1 | 1484.0 |
| Powdered Sugar 6X | 13.0 | 520.0 |
| Borden Artificial Cherry Flavor #5463 | .1 | 4.0 |
| Paramount C (Durkee) Fat | 1.5 | 60.0 |
| | 100.0 | 4000.0 |

*A. E. Staley Manufacturing Division, Staley Continental, Inc.

Procedure

1. SWEETOSE ® 4300 syrup was added to an agitated swept surface kettle.

2. MIRA-GEL ® 463 starch was added and blended until homogeneous.

3. SOFT-SET TM starch was added and blended until homogeneous.

4. Cherry juice and water were blended into the mixture.

5. STALEYDEX ® 111 dextrose was added slowly to the mixture.

6. Flavor was dispersed into powdered sugar and blended into the mixture.

7. Paramount C fat was melted and blended into the mixture to yield a blueberry fruit filling.

What is claimed is:

1. An edible fruit filling composition for incorporation within a pastry dough sheath comprising:
   (a) about 1 to about 7 percent cold water swelling granular starch;
   (b) about 3 to about 8 percent pregelatinized starch; and
   (c) about 40 to about 70 percent sweetener component selected from the group comprising sucrose, dextrose, corn syrup, fructose and high fructose corn syrup.

2. A fruit filling composition of claim 1 wherein said pregelatinized starch has a particle size of about 70 microns to about 350 microns.

* * * * *